United States Patent Office 2,776,973
Patented Jan. 8, 1957

2,776,973

PROCESS FOR THE MANUFACTURE OF 3,7-DIMETHYL-XANTHINE DOUBLE SALTS

Gerhard Gergely, Vienna, Austria, assignor to Gerot Pharmazeutika Dipl. Ing. Dr. Walter Otto and Dr. Gerhard Gergely, Vienna, Austria, an Austrian partnership No Drawing. Application May 27, 1955,
Serial No. 511,747

2 Claims. (Cl. 260—253)

The present invention relates to a new method for preparing 3,7-dimethyl-xanthine magnesium oleate which recently is used for the causal therapy of arteriosclerosis.

In the German Patent No. 835,498 there is described a process for preparing of 3,7-dimethyl-xanthine double salts in which a soluble theobromine salt and a soluble magnesium salt is caused to react at elevated temperatures with oleic acid in the presence of a suitable solvent or suspending medium. However, the taking place of this reaction depends upon the observation of definite conditions of reaction. Thus the presence of a solvent or a suspending medium and use of higher temperatures are indispensable. Further characteristics of said process are the maintainance of a certain pH-range and the addition of highly dispersed silica, that latter for obtaining unobjectionable, good filterable products.

Such a method of working raises the price of the process considerably, whereby the supply of energy and the expenditure of work for centrifuging and drying the raw product cause remarkable costs.

Further the theobromine magnesium oleate obtained according to the known method is a sticky mass, so that the working up becomes a technical problem and can be effected in a satisfactory manner only by addition of highly dispersed agents.

It is one object of the present invention to remove all these disadvantages and to provide a simple and improved method for making 3,7-dimethyl-xanthine double salts (theobromine magnesium oleate).

It has been discovered that the manufacture of 3,7-dimethyl-xanthine magnesium oleate is possible in a simple manner if 3,7-dimethyl-xanthine and magnesium oxide are reacted with oleic acid in absence of a solvent or suspending medium and without applying external heating.

The process of making 3,7-dimethyl-xanthine double salts according to the present invention consists in adding a finely powdered homogeneous mixture of 3,7-dimethyl-xanthine and magnesium oxide to oleic acid under continuously stirring until the reaction mixture is solidifying forming a solid mass. The components of the reaction are mixed preferably in a mol ratio of approximately 1 mol 3,7-dimethyl-xanthine to about 1 up to 2.5 mol magnesium oxide and to about 1 up to 2 mol oleic acid.

The reaction is exothermic and the product obtained being initially viscous then solidifies.

The 3,7-dimethyl-xanthine magnesium oleate thus obtained can be carried over without any further expenditure of work into the desired form of remedy and can be granulated and pressed.

The following examples serve to illustrate the present invention without however limiting the same thereto.

*Example 1*

180 g. of 3,7-dimethyl-xanthine are intimately mixed with 50 g. of magnesium oxide and the mixture is then brought in 300 g. of oleic acid under permanent stirring. At the same time preferably some ccm. of water are added. The initially viscous slurry solidifies forming a solid mass of 3,7-dimethyl-xanthine magnesium oleate which is obtained in quantitative yield.

*Example 2*

360 g. of 3,7-dimethyl-xanthine are intimately mixed with 120 g. of magnesium oxide and the mixture is then brought in 1000 g. of oleic acid under permanent stirring. The formation of 3,7-dimethyl-xanthine magnesium oleate ensues in a manner analogous to that described in Example 1. Preferably the reaction is initiated by addition of little amounts of water. The yield is quantitative.

*Example 3*

180 g. of 3,7-dimethyl-xanthine are intimately mixed with 282.5 g. oleic acid and to this mixture are added 40 g. of magnesium oxide, whilst stirring continuously. The initially viscous slurry solidifies forming a solid mass. The formed 3,7-dimethyl-xanthine magnesium oleate is obtained in quantitative yield.

The 3,7-dimethyl-xanthine magnesium oleate obtained according to this invention forms a granulated amorphous substance which is slightly yellow colored and smells slightly like oleic acid.

I claim:

1. A process of producing 3,7-dimethyl-xanthine double salts which comprises reacting approximately 1 mol 3,7-dimethyl-xanthine and about 1 up to 2.5 mol magnesium oxide with about 1 up to 2 mol oleic acid in absence of a solvent or suspending medium and without external heating.

2. A process of producing 3,7-dimethyl-xanthine double salts which comprises adding a finely powdered homogeneous mixture of approximately 1 mol 3,7-dimethyl-xanthine and about 1 up to 2.5 mol magnesium oxide to about 1 up to 2 mol oleic acid in absence of a solvent or suspending medium and without applying external heating under continuously stirring until the reaction mixture is solidifying forming a solid mass.

No references cited.